INVENTOR
WILLIAM S. HOLMES
BY Allen J. Jobbe
AGENT.

INVENTOR
WILLIAM S. HOLMES

BY [signature]

AGENT

NARROW-BAND, SINGLE-OBSERVER, TELEVISION APPARATUS

Filed Sept. 15, 1966

3 Sheets-Sheet 3

INVENTOR
WILLIAM S. HOLMES

BY [signature]

AGENT.

3,507,988
NARROW-BAND, SINGLE-OBSERVER, TELEVISION APPARATUS

William S. Holmes, West Falls, N.Y., assignor to Cornell Aeronautical Laboratory, Inc., Buffalo, N.Y., a corporation of New York
Filed Sept. 15, 1966, Ser. No. 579,655
Int. Cl. H04n *3/00, 5/38;* H01j *29/89*
U.S. Cl. 178—6.8 5 Claims

ABSTRACT OF THE DISCLOSURE

A narrow-band, single observer, television apparatus including an eye position sensor responsive to changes in direction of the eye's center of vision, scan controllers responsive to the eye position sensor and television camera and display tubes responsive to the scan controllers, the scan controllers generating spiral scanning patterns in the camera and display.

Figure 1:
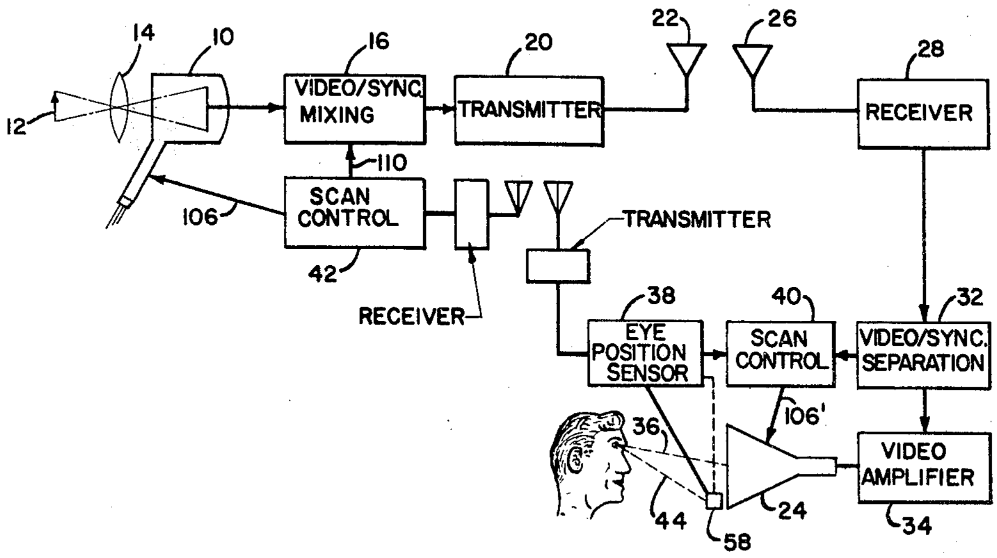

The present invention relates to a narrow bandwidth, single-observer television apparatus.

Television-type communication systems are being proposed and used in an ever-increasing number of new applications involving both ground-to-ground and air- or space-to-ground surveillance or control. In all systems, a reduction of required bandwidth is advantageous to achieve economy of spectrum. In addition, the reduction of transmitted power required for a given received signal-to-noise ratio, made possible by the bandwidth reduction has even greater significance in the power-limited environment of a space vehicle.

The operational requirements of many of these communication systems cannot be satisfied by a simple slowed down video, bandwidth reduction technique. Although many schemes for reducing required transmission bandwidth through reduction in scene redundancies are known, implementation has been discouraging in that either the reconstructed picture has certain very undesirable characteristics, or the reduction in bandwidth turns out to be quite modest.

The present invention provides a television transmission and display system providing high resolution remote viewing for a single observer over a channel of approximately one-tenth the bandwidth of conventional television, and is usable over ranges of up to approximately 10,000 miles.

The principles of the present invention are based on the fact that the portion of a scene observed at any instant by an individual contains much more information than the observer can use. Except for that portion of the scene inclued within the very narrow, solid angle subtended by the eye's fovea centralis, lower visual resolutions at greater distances from the fovea preclude accepting all information available in a uniform resolution display. As is known the central area of the eye's retina, called the fovea centralis, contains a large number of resolution elements closely packed into a small area, whereas the region of the retina outward from this fovea region has a progressively lower resolution element density. Therefore, the actual high resolution "seeing" of the eye takes place only within the solid angle subtended by the fovea. For example, in a total field of view of 51° by 40° at 20 inches from an observer only an area of 2° by 2° is resolved in great detail by the eye; it is, therefore, not necessary to display highly resolved imagery in the remaining field.

It is accordingly an object of the present invention to provide a narrow-band television system that matches the resolution characteristics of the display to those of the eye.

It is another object of the present invention to provide a narrow-band television system capable of highly resolving a portion of the transmitted field, the location of which is variable in accordance with the line of sight of an observer.

These and other objects and advantages of the present invention will become apparent as a discussion thereof proceeds.

Basically, the present invention provides a system comprised of means to sense the position of an observer's fovea centralis and means in response thereto to provide high resolution scanning only of the area subtended thereby.

Figure 2:
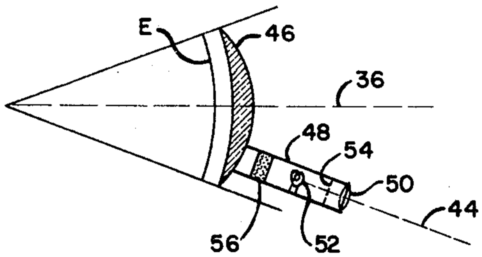
Figure 3:
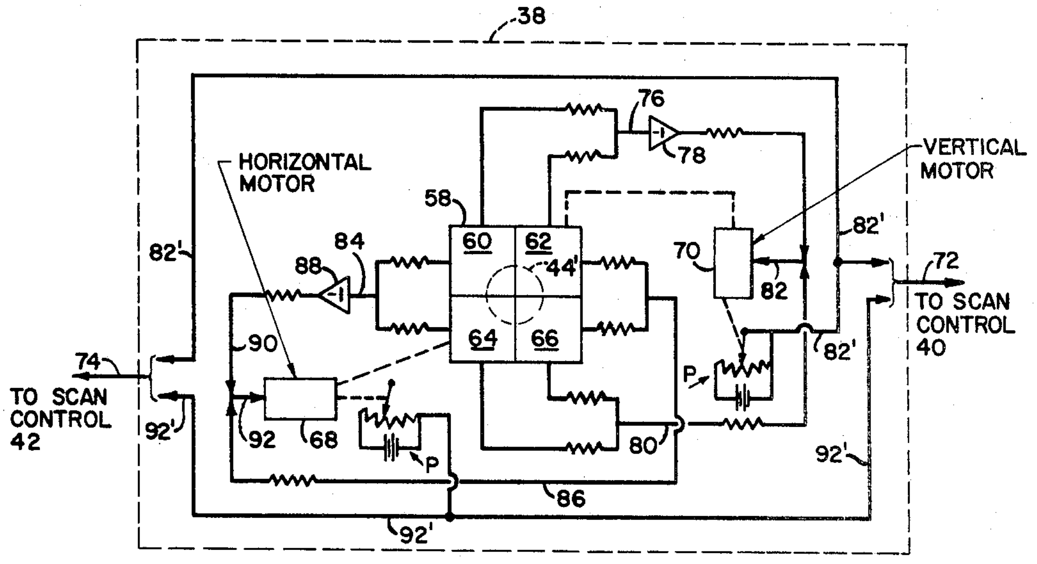
Figure 4:
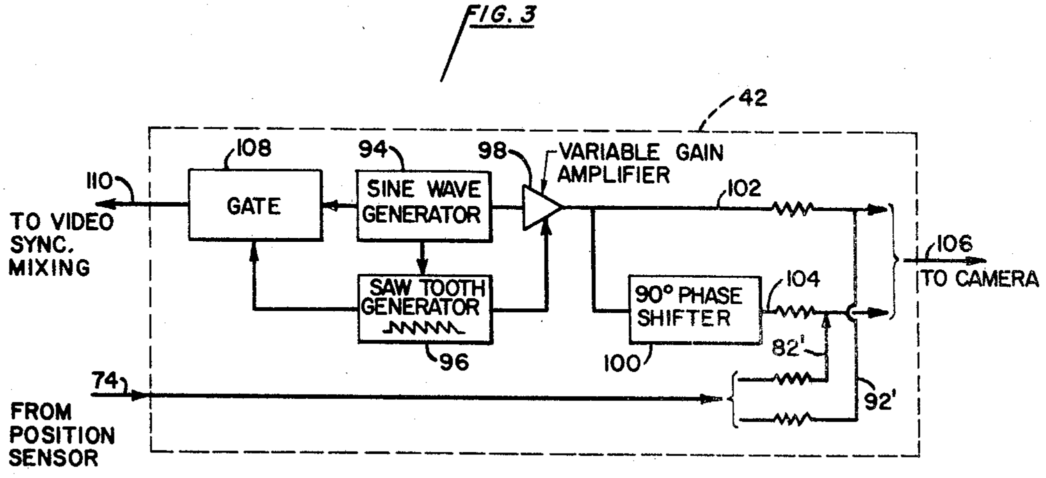
Figure 3A:
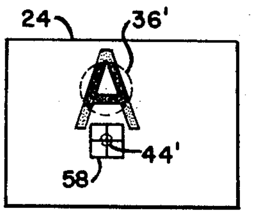
Figure 5:
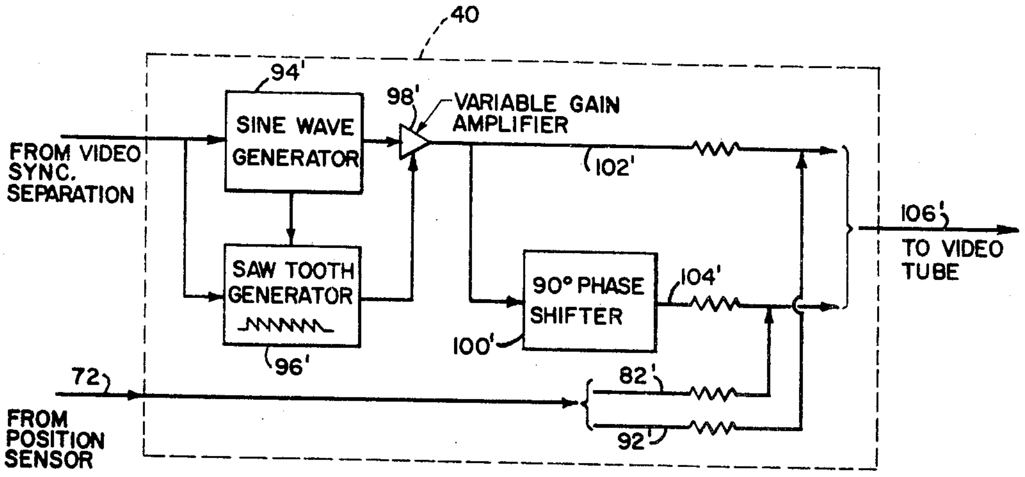
Figure 6:
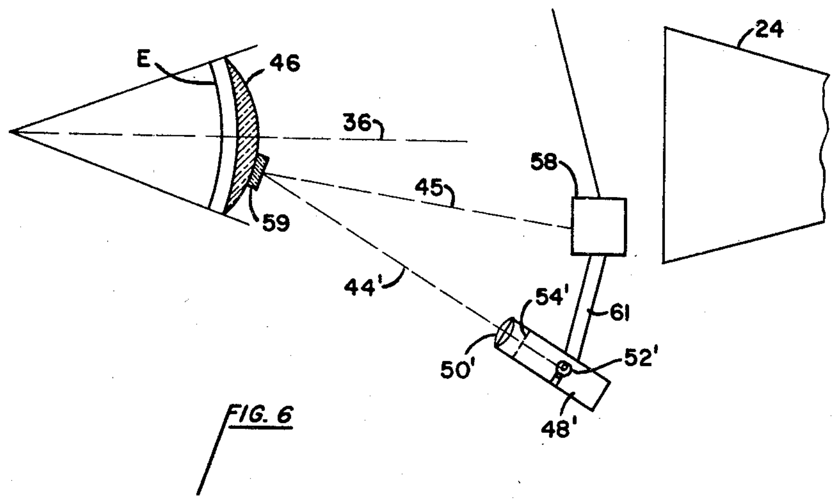

For a fuller understanding of the present invention, reference should be had to the following detailed description of the same taken in conjunction with the accompanying drawings wherein:

FIGURE 1 is a block diagram of the over-all system in accordance with the present invention, FIGURE 2 is a schematic view of one type of input device for the eye position sensor, FIGURE 3 is a schematic of one type of eye position sensing unit, FIGURE 3A is an enlarged detail of the wand of FIGURE 3 imposed upon the video tube of FIGURE 1, FIGURE 4 is a block diagram of one type of transmission scanning control, FIGURE 5 is a block diagram of one type of reception scanning control, and FIGURE 6 is a modification of the structure shown in FIGURE 2.

Referring now to the drawings and more particularly to FIGURE 1, numeral 10 represents a conventional television camera that is focused on an object 12 through lens 14. A conventional video signal and synchronization signal mixer is represented at 16, the signals from which being modulated, amplified, and transmitted in the regular way by elements 20 and 22, except that only frame synchronization is required.

The signals radiating from antenna 22 are transmitted in the regular way to video tube 24 by antenna 26, receiver 28, separator 32 and amplifier 34.

As shown in FIGURE 1, an observer is depicted as looking at tube 24 and his line of sight is indicated by numeral 36. An eye position sensor 38, to be described in greater detail hereinbelow, senses the position of the observer's eye and therefore his line of sight at any given instant. Signals from position sensor 38 are used to develop proper scan signals emanating from units 40 and 42. As will become apparent hereinbelow, the signals from scan controllers 40 and 42, with eye position information from sensor 38 cause the scan pattern on video tube 24 and camera tube 10 to center about the observer's instantaneous line of sight, and the type of scan is chosen such that the central portion thereof is capable of high resolution as, for example, a spiral scan. Thus the video information on tube 24 will be of high resolution in the area of line of sight 36 and of lower resolution throughout the rest of the field.

The actual size of the high resolution area depends upon the distance between observer and tube as well as the angle subtended by the eye's fovea centralis at that distance.

One type of eye position sensor has an input thereto which responds to a beam of light 44 that is transmitted from a device adapted to move with the eye. As shown in FIGURE 2, a noncorrective contact lens 46 is supported from the eye E in the usual manner. Fixed to the lower portion of the lens 46 is a miniature projection lamp 48 containing a lens 50, a source of light 52 and an aperture 54. A suitable heat-absorbing material 56 may be provided to protect the eye from the small amount of heat generated by source 52. Sensor 38 has a wand 58 which as will be seen later, follows beam 44 and thus generates a signal that is a function of beam position and, therefore, eye position.

Referring to FIGURE 3, it can be seen that the face of wand 58 is divided into distinct quadrants 60, 62, 64, and 66, each composed of a light-sensitive material such as cadmium sulphide, for example. Wand 58 is adapted to be driven by motors 68 and 70 and is mounted on a translation mechanism that may be similar to a conventional X–Y plotter. The mechanism is located substantially in the plane of the face or screen of the video tube 24 such that the wand can be positioned on any horizontal and vertical axis intersection point thereon. As shown in FIGURE 3A the wand 58 will aways be positioned below the area 36′ substended by the eye's fovea centralis. This is so because lamp 48 is below the observer's line of sight 36, and area 44′ subtended by beam 44 is centered on wand 58.

The circuitry of FIGURE 3 is designed such that motors 68 and 70 cause wand 58 to follow area 44′ and develop signals at 72 and 74 which are each a function of the vertical and horizontal distances traversed thereby. To this end, the light-sensitive cells develop voltages in response to light falling thereon from beam 44′. The developed voltages from cells 60 and 62 are combined at 76 and pass through a minus gain amplifier 78, whereas the developed voltages from cells 64 and 66 are combined at 80. The signal from 80 is combined with the signal from 78 to develop an output signal 82 that controls vertical positioning motor 70. Thus, when the beam 44′ lies below cells 60 and 62, the voltage from 80 is greater than that from 78 and the motor 70 is actuated to cause wand to move down until it is vertically centered on wand 58. As is apparent, when beam 44′ is above 64 and 66 the signal at 82 actuates motor 70 to cause wand 58 to move upwardly.

In a similar manner the voltages from cells 60 and 64 are combined at 84 and those from cells 62 and 66 are combined at 86. The signal from 84 passes through a minus gain amplifier 88 to develop a signal in line 90 which is combined with 86 at 92 that acts as a control signal for horizontal positioning motor 68. Thus when beam 44′ lies to the right of cells 60 and 64, a signal is developed at 92 which actuates motor 68 to move wand 58 to the right until it is horizontally centered on beam 44′. It can, therefore, be seen that signals 82 and 92 control motors 70 and 68 to cause the wand to follow the beam 44′. Conventional potentiometers, P, mechanically coupled to the shafts of motors 68 and 70 are provided to develop output voltage signals 92′ and 82′ which are a function of the observer's eye position, at any given instant. These signals, 82′ and 92′ are fed to video scan controller 40 and camera scan controller 42 to synchronize the center of the scan patterns of each with the position of the observer's eye.

One method of constant speed scanning that will transmit high and low resolution picture elements is to use a spiral scanner. As shown in FIGURE 4, a sine wave generator 94, a saw tooth generator 96, a variable gain amplifier 98 and a phase shifter 100 function in a conventional manner to develop signals at 102 and 104 that generate a spiral scan when applied to camera 10 via line 106. The eye position information signals 82 and 92 are applied to lines 104 and 102 to adjust the center of the spiral scan in accordance with the observer's line of sight. A conventional gate 108 is provided to send synchronization signals via line 110 to mixer 16.

The video scan control 40 is identical to the camera scan control 42 just described, thus the same numerals primed refer to corresponding parts. Here, however, the eye positional information signals 82 and 92 are applied to center the spiral scan on the video tube in accordance with the position of an observer's eye.

As shown in FIGURE 3A, assuming the camera 10 is focused on a field containing the letter A and the observer's line of sight is directed at the central area of the A as shown at 36, then the lamp beam 44 will be directed below that area as shown at 44′. This causes wand 58 to center on area 44′ and also causes the video and camera spiral scans to center on area 36′. Since the high resolution position of a spiral scan is at the center thereof, the central portion of the A contained within area 36′ will be highly resolved, whereas the top and bottom of the A will be of low resolution. Should the observer wish to see the top of the A with greater definition, he only has to raise his eyes and look there, and that portion will then become highly resolved.

With the video tube being a 24-inch rectangular television tube located 20 inches from the observer's eyes, and a 50 field-25 frame interlaced spiral scan with constant acceleration vector growth, it only takes a bandwidth of approximately $.3\times10^6$ cycle or .3 megacycle to obtain the resolution of 525-line television system in the area subtended by the observer's fovea centralis. This is to be contrasted with the conventional bandwidth of more than three megacycles.

As shown in FIGURE 6, an obvious reversal of the structure shown in FIGURE 2 would affix the projection lamp 48′ and its related structure to move with wand 58 by means 61. In this manner, it would only be necessary for the eye to carry a reflector in the form of a mirror patch 59 so located that a beam 44′ from lamp 52′ is reflected therefrom toward the light sensitive portions of wand 58 as shown at 45.

While a preferred arrangement for carrying out the principles of the present invention has been described in detail, modifications will occur to those skilled in the art. Therefore, it is intended that the invention be limited only by the scope of the appended claims.

What is claimed is:

1. In narrow-band television apparatus, the combination comprising;

(a) a television camera,
(b) means for scanning said camera,
(c) video display means,
(d) means for scanning said video display means,
(e) position sensing means responsive to the movement of an observer's eye for developing signals indicative of the position thereof,
(f) control means responsive to said signals for controlling said means for scanning said camera and said means for scanning said display means, and
(g) said means for scanning said camera and video display means include means responsive to said control means for highly resolving only a portion of said video display means with respect to the remaining portions thereof.

2. The apparatus of claim 1 wherein;

(g) said position sensing means are responsive to the position of an observer's fovea centralis,
(h) said means for highly resolving include means for developing spiral scanning patterns having high resolution centers, and
(i) said control means include means for causing said centers to shift, whereby said centers coincide with an observer's fovea centralis.

3. In narrow-band television apparatus, the combination comprising;

(a) a television camera
(b) means for scanning said camera,
(c) video display means,
(d) means for scanning said video display means,
(e) position sensing means responsive to the movement of an observer's eye for developing signals indicative of the position thereof,
(f) control means responsive to said signals for controlling said means for scanning said camera and said means for scanning said display means (g) said means for scanning said camera and for scanning said display means include means for high resoultion scanning of an area that is subtended by an observer's fovea centralis, and (h) said control means include means for shifting said high resoultion scanning areas in response to said position sensing means.

4. The apparatus according to claim 3 wherein;

(j) said position sensing means comprises a contact lens adapted to be worn by an observer, projection lamp means arranged on an outer portion of said contact lens to provide a beam, and movable light-sensitive means for following said beam, (k) said camera and video display scanning means comprise spiral scan generators, and (l) said control means are responsible to said light-sensitive means for controlling the spiral scan center positions.

5. The apparatus according to claim 3 wherein;

(j) said position sensing means comprise a contact lens adapted to be worn by an observer, a mirror patch fixed to said contact lens, movable light-sensitive means for following reflected light from said mirror patch and projection means movable with said light sensitive means for projecting light towards said mirror patch, (k) said camera and video display scanning means comprise spiral scan generators, and (l) said control means are responsive to said light-sensitive means for controlling the spiral scan center position.

References Cited

UNITED STATES PATENTS

| | | | |
|---|---|---|---|
| 2,581,589 | 1/1952 | Herbst | 178—6.8 |
| 3,205,303 | 9/1965 | Bradley | 178—6.8 |
| 3,379,885 | 4/1968 | Nork | 351—7 |

ROBERT L. GRIFFIN, Primary Examiner

J. A. ORSINO, Jr., Assistant Examiner

U.S. Cl. X.R.

178—72, 785; 250—221; 351—7